United States Patent
Mueggenburg et al.

[11] Patent Number: 5,804,066
[45] Date of Patent: Sep. 8, 1998

[54] INJECTOR FOR SCWO REACTOR

[75] Inventors: H. Harry Mueggenburg, Carmichael; Donald C. Rousar, Fair Oaks; Marvin F. Young, El Dorado Hills, all of Calif.

[73] Assignee: Aerojet-General Corporation, Rancho Cardova, Calif.

[21] Appl. No.: 598,938

[22] Filed: Feb. 8, 1996

[51] Int. Cl.⁶ .................................................. C02F 1/72
[52] U.S. Cl. .......................... 210/177; 210/205; 210/761; 239/422
[58] Field of Search .................................. 210/761, 762, 210/177, 181, 198.1, 205, 206; 239/422, 423; 431/4, 8, 10, 181, 187

[56] References Cited

U.S. PATENT DOCUMENTS

| | | | |
|---|---|---|---|
| 4,541,796 | 9/1985 | Anderson | 431/187 |
| 4,681,258 | 7/1987 | Jenkins et al. | 239/422 |
| 4,792,408 | 12/1988 | Titmas | 210/747 |
| 5,100,560 | 3/1992 | Huang | 210/726 |
| 5,106,513 | 4/1992 | Hong | 210/759 |
| 5,232,604 | 8/1993 | Swallow et al. | 210/759 |
| 5,240,619 | 8/1993 | Copa et al. | 210/752 |
| 5,263,849 | 11/1993 | Irwin et al. | 431/187 |
| 5,326,540 | 7/1994 | Chastagner | 422/205 |
| 5,358,646 | 10/1994 | Gloyna et al. | 210/762 |
| 5,372,725 | 12/1994 | Halff et al. | 210/761 |
| 5,384,051 | 1/1995 | McGinness | 210/761 |
| 5,386,055 | 1/1995 | Lee et al. | 562/512.2 |
| 5,387,398 | 2/1995 | Mueggenburg et al. | 422/168 |
| 5,421,998 | 6/1995 | Li et al. | 210/136 |
| 5,425,883 | 6/1995 | Reed et al. | 210/761 |
| 5,427,764 | 6/1995 | Barber | 423/659 |
| 5,492,634 | 2/1996 | Hong et al. | 210/761 |
| 5,549,877 | 8/1996 | Gateau et al. | 431/181 |
| 5,597,298 | 1/1997 | Snyder et al. | 239/423 |

FOREIGN PATENT DOCUMENTS

WO 93/00304  1/1993  WIPO.

*Primary Examiner*—Peter A. Hruskoci
*Attorney, Agent, or Firm*—Townsend and Townsend and Crew LLP

[57] ABSTRACT

Fuel, oxidant and reactant for a supercritical water oxidation reactor are fed through an injector in which the flow are arranged such that the oxidant feed surrounds the fuel feed and the shields the fuel feed from the reactant feed. Excessive reactant temperature is thus avoided, and the reaction can proceed in a highly efficient manner.

19 Claims, 9 Drawing Sheets

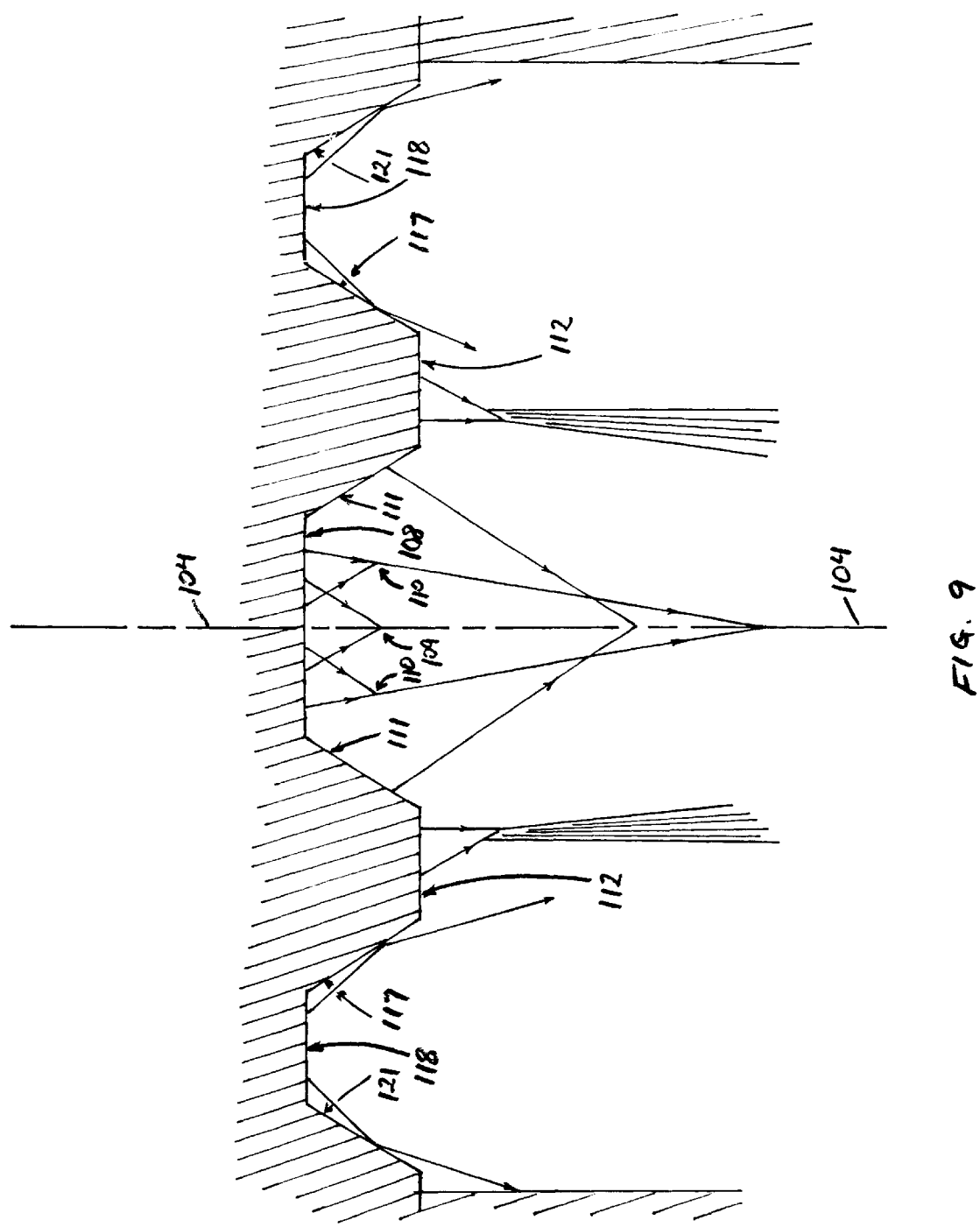

INJECTOR FOR SCWO REACTOR

This invention lies in the field of supercritical water oxidation, and addresses in particular the means by which reactants are combined and mixed in a supercritical water oxidation reactor.

BACKGROUND OF THE INVENTION

Supercritical water oxidation (SCWO) is the oxidation of combustible material in water under conditions above the thermodynamic critical point of water, which is 374° C. and 221 bar ($2.21 \times 10^7$ pascals). Water at supercritical conditions has a density of about one-tenth that of liquid water, and exhibits properties similar to those of a dense gas, including miscibility with organics and combustion gases in all proportions. These qualities result in a single-phase reaction medium containing water, the combustible organics and an oxidizer, allowing oxidation of the organics to proceed without the need for mass transport across an interface. As a single-phase reaction medium, supercritical water provides an unusually high level of efficiency in oxidizing organics to harmless oxidation products. Operation under these conditions combines the benefits of high density, which permits high reaction rates at moderate temperatures, with high mass diffusivity and low viscosity. Air pollution problems are minimal compared with thermal incineration, since the operating temperature in a supercritical medium is low enough to prevent any significant formation of $NO_x$ or $SO_2$. Furthermore, any acid gases formed by the oxidation can be neutralized in situ to inorganic salts by the addition of caustic. Since inorganic salts are not soluble in the supercritical water, they precipitate out, which facilitates their removal. When operated effectively, SCWO is useful for the oxidation of organics in waste water streams containing up to 20% organics by weight, with removal efficiencies in excess of 99.99%. SCWO is also useful in the disposal of a wide range of other organic wastes, including toxic wastes, hazardous chemicals, food processing waste, sewage, and explosive materials. Typical reactor conditions are 500° to 650° C. and 250 bar $2.50 \times 10^7$ pascals) with residence times of 10 to 30 seconds.

Efficient destruction of waste streams requires that the desired oxidation reactions be performed essentially to completion within short residence times. This is most readily achieved with tubular reactors where the flows of all fluids are unidirectional along the axis of the tube. As reactors are scaled up for higher throughput rates, however, efficiency becomes more difficult to achieve in view of the increasing difficulty in controlling $NO_x$ and $SO_2$ formation and salt precipitation on the reactor wall. A major determining factor in establishing and maintaining a high reaction rate and avoiding deposition on the walls is the fluid dynamics of the reaction mixture. Optimal results will be achieved when the reactants are thoroughly mixed yet confined to a linear flow direction along the axis of the reactor, without recirculation zones or deviation of the flow toward the reactor wall. Flow patterns also affect temperature control, particularly in systems where the combustible material is supplemented by fuel fed to the reactor to achieve and maintain the desired supercritical temperature.

SUMMARY OF THE INVENTION

This invention provides a combination injector for a tubular continuous-flow supercritical water oxidation reactor, which feeds to the reactor both the combustible material to be treated and supplementary fuel, together with an oxidant and optionally any other fluids which the reactor is designed to require for its operation. These feed materials are fed through individual ports, with the fuel fed through a central port or central cluster or array of ports, the organics-containing combustible matter fed through a group of ports arranged in an array surrounding the fuel port, and the oxidant fed through one or more ports arranged between the combustible matter ports and the fuel port or fuel ports. The fuel is heated to at least 375° C., preferably 500°–650° C., either prior to its passage through the combination injector or immediately upon its emission from the injector, and the introduction of the oxidant between the fuel port and the combustible matter ports at least partially shields the combustible matter from direct contact with the incoming fuel, thus preventing the combustible matter from reaching excessive temperatures. Full mixing does not occur until locations which are far enough downstream that the heat of the burning fuel has dissipated or is lowered by coolant water.

In certain embodiments of the invention, the incoming fuel is heated inside the reactor itself by hot water which is separately injected into the reactor. The injector can thus be designed with one or more hot water ports placed adjacent to the fuel port(s). The oxidant feed will then be arranged around both the fuel and the hot water ports, shielding the incoming combustible matter from direct contact with the hot water and the heated fuel.

These and other features and advantages of the invention and of its preferred embodiments will be more apparent from the description that follows.

BRIEF DESCRIPTION OF THE DRAWINGS

FIG. 7b is an enlarged cross section of a portion of the injector shown in FIG. 7a.

FIG. 9 is a longitudinal cross section of the injector of FIG. 8.

DETAILED DESCRIPTION OF THE INVENTION AND PREFERRED EMBODIMENTS

While this invention is broad in scope, encompassing a wide range of port configurations and arrangements, the invention will be best understood by a detailed examination of specific embodiments. The drawings depict several such embodiments.

The combustible matter in these embodiments will be referred to for convenience as a waste material, although it is understood that this is only one of various types of streams that can be treated by these reactors.

Figure 1A:
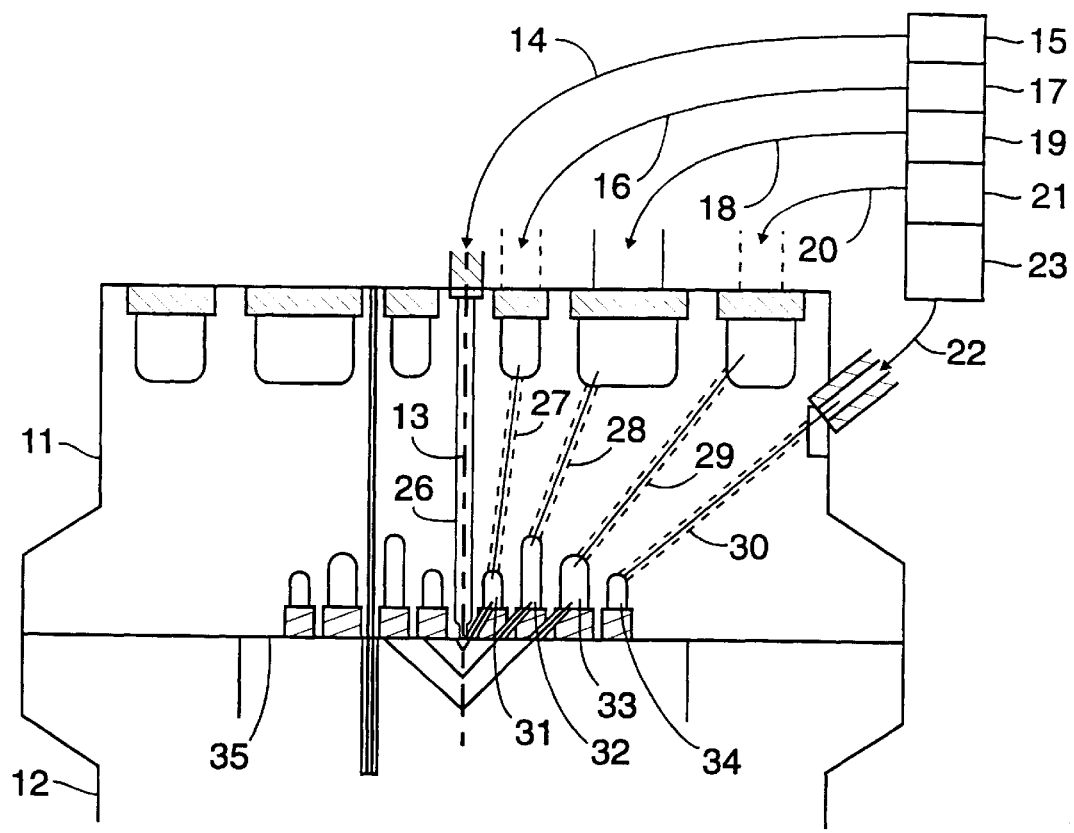
FIG. 1a is a longitudinal cross section of one example of an injector in accordance with the present invention.
Figure 1B:
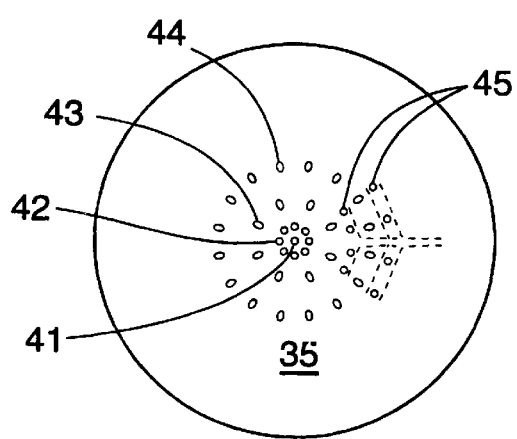
FIG. 1b is a plan view of the face of the injector of FIG. 1a exposed to the reaction zone of a tubular SCWO reactor.

The injector of FIGS. 1a and 1b is designed to feed fuel to the center line of a tubular reactor, to heat the fuel upon its emergence from the injector by a series of hot water jets surrounding the fuel jet at the centerline, and to direct the flows of the hot water jets, the oxidant and the waste material toward the centerline to combine with the burned fuel. Shown in FIG. 1a is the injector 11, which is a circular attachment to a inlet end of the tubular reactor 12. The injector is shown in longitudinal cross section along the center line 13 of both the injector and the reactor. Supply lines and sources of supply to the injector are shown in representational block diagram form. These include a fuel supply line 14 supplying fuel from a fuel reservoir 15, a hot water supply line 16 supplying water from a hot water reservoir 17, an oxidant supply line 18 supplying oxidant from an oxidant reservoir 19, a waste fluid supply line 20 supplied by a waste fluid reservoir 21, and an optional cooling water supply line 22 supplied by a cooling water reservoir 23.

The fuel supply line 14 directs the fuel to a fuel duct 26 inside the injector which is coaxial with the centerline 13. Additional ducts internal to the injector are a hot water duct 27, an oxidant duct 28, a waste material duct 29, and a cooling water duct 30, all shown in dashed lines. Each of these ducts connects the appropriate supply line to a corresponding distribution reservoir 31, 32, 33, 34 within the body of the injector. These distribution reservoirs are circular, forming concentric circles around the fuel duct 13, and each supplies a circular array of ports on the face 35 of the injector which forms one of the internal walls of the tubular reactor 12.

FIG. 1b depicts the injector face 35 and the injection ports. The fuel port 41 lies at the center of the array of ports; the hot water ports 42 are eight in number and form a circular array surrounding and immediately adjacent to the fuel port 41; the oxidant ports 43 are eight in number and form a larger circular array surrounding the hot water ports 42; and the waste material ports 44 are sixteen in number and form a still larger circular array surrounding the oxidant ports 43. The cooling water ports 45, although not all are shown, are approximately thirty-two in number, and form two circular arrays, one inside and the other outside the circular array of waste material ports. The arrangement of the cooling water ports is susceptible to the greatest variation within the scope of this invention, in terms of their number, arrangement and positions relative to the remaining ports, depending on the construction of the tubular reactor and the possible presence of coolant ducts along the side walls of the reactor.

The hot water ports 42, oxidant ports 43 and waste material ports 44 are machined or otherwise engineered to direct their respective jets to the centerline 13, where they will converge toward and insect with the jet emerging from the fuel port 41. FIG. 1a shows these converging jets. Also shown in FIG. 1a is a thermowell 48 extending into the reaction space to permit temperature monitoring of the reaction.

Figure 2:
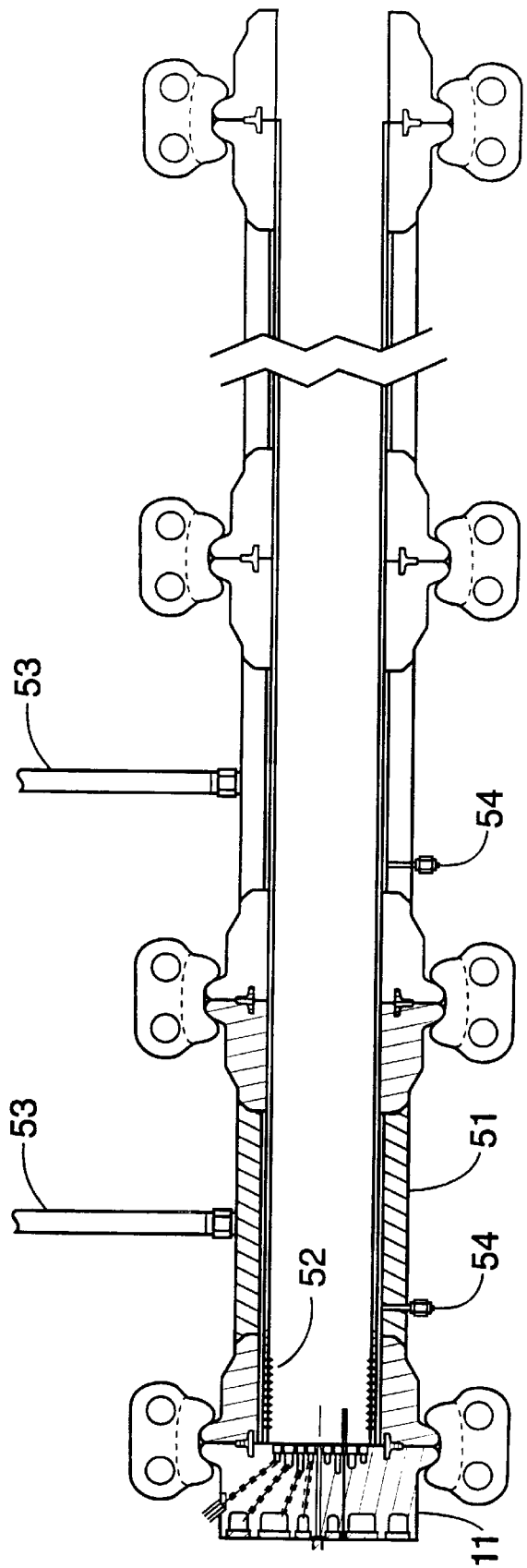
FIG. 2 is a cross section of a tubular SCWO reactor incorporating the injector of FIGS. 1a and 1b.

FIG. 2 illustrates the injector 11 assembled to a tubular reactor assembly formed in sections 51. Incorporated into the wall of the tubular reactor assembly are cooling water inlets 52 to provide boundary layer flow control at the reactor wall, and thereby prevent solids deposition on the reactor wall and help maintain the temperature in the reactor to within the optimal range for the desired reactions. Cooling water is supplied to these inlets 52 by feed pipes 53 spaced at intervals along the exterior of the reactor wall (one per wall section in this particular example). Examples of flow ducts within the wall itself and their arrangement along the internal wall surface for this type of cooling water introduction are found in U.S. Pat. No. 5,387,398, issued Feb. 7, 1995 on an application applied for on Dec. 3, 1993. This patent is incorporated herein by reference for all legal purposes to be served thereby. The reactor assemble further contains wall taps 54 for pressure and temperature monitoring of the reaction.

Figure 3:
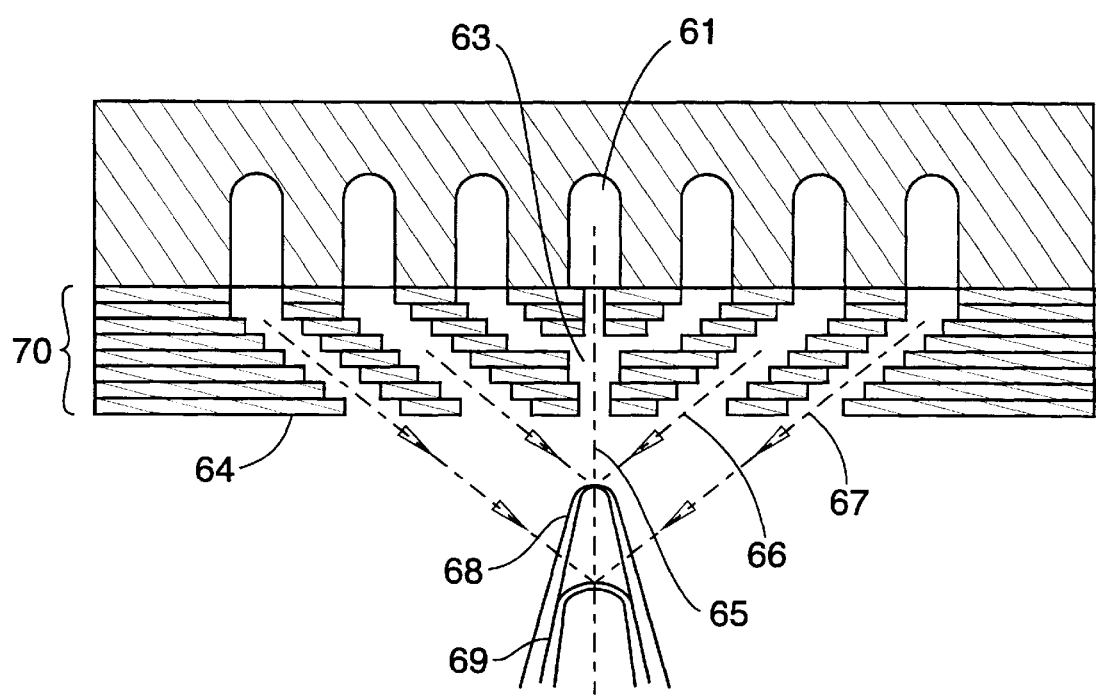
FIG. 3 is a longitudinal cross section of a second example of an injector in accordance with the present invention.

FIG. 3 shows a variation on the flow arrangement of FIGS. 1a and 1b, as well as an enlargement of the ports and one method of constructing them to direct the jets toward the reactor centerline. In this arrangement, the fuel supply 61 is combined with the hot water supply 62 in a mixing chamber 63 in very close proximity to the injector face 64. The fuel thus emerges from the injector face 64 as a single heated stream 65 at the centerline of the injector, ready for combustion upon contact with the oxidant. The oxidant jets 66 and waste material jets 67 emerge from circular port arrays encircling and converging toward the heated fuel stream 65 as in FIGS. 1a and 1b. The flow patterns formed by these converging streams are shown by their profiles 68, 69.

The passages leading to the ports in the construction shown in FIG. 3 are formed by platelets 70 (metallic laminates). While platelet technology is well known, the following is a brief review of how it might be used in this present invention. Masks are first applied to individual metallic layers (or platelets), either by stencils or by photographic techniques. The platelets are then chemically etched through the masks, and the masks are then removed. Lamination of the platelets is then achieved by either diffusion-bonding, roll-bonding, brazing, or other conventional techniques for laminated metals. Diffusion-bonding involves hot-pressing the platelets together, using pressures typically in the range of 6.9 to 20.7 MPa (1000 to 3000 psi) and temperatures typically in the range of 455°–540° C. The individual platelets themselves may be made of any material which can be formed into appropriately thin sheets, which is susceptible to etching and diffusion-bonding, and preferably which is also corrosion-resistant under the conditions encountered in super-critical water oxidation. Examples of metallic materials which meet this description are Inconel and steel. The thickness of the platelets is not critical and may vary. Platelets having thicknesses less than about 0.025 inch (0.064 cm), or within the range of about 0.001 inch (0.0254 cm) to about 0.025 inch (0.064 cm), per platelet will most often be used. The aggregate of the platelets will most often be less than about 0.3 inch (0.762 cm) in thickness, more preferably about 0.03 inch (0.0762 cm) to about 0.3 inch (0.762 cm), and most preferably from about 0.05 inch (1.27 cm) to about 0.2 inch (0.51 cm).

The drawings discussed above show an injector designed to supply a single fuel jet along the centerline of the tubular reactor with the jets of the other feed components arranged in concentric circles around the central fuel jet. This invention can also be applied in the use of multiple arrays distributed over the face of the injector, each array consisting of an arrangement similar to the array shown in FIGS. 1a or 3.

Figure 4A:
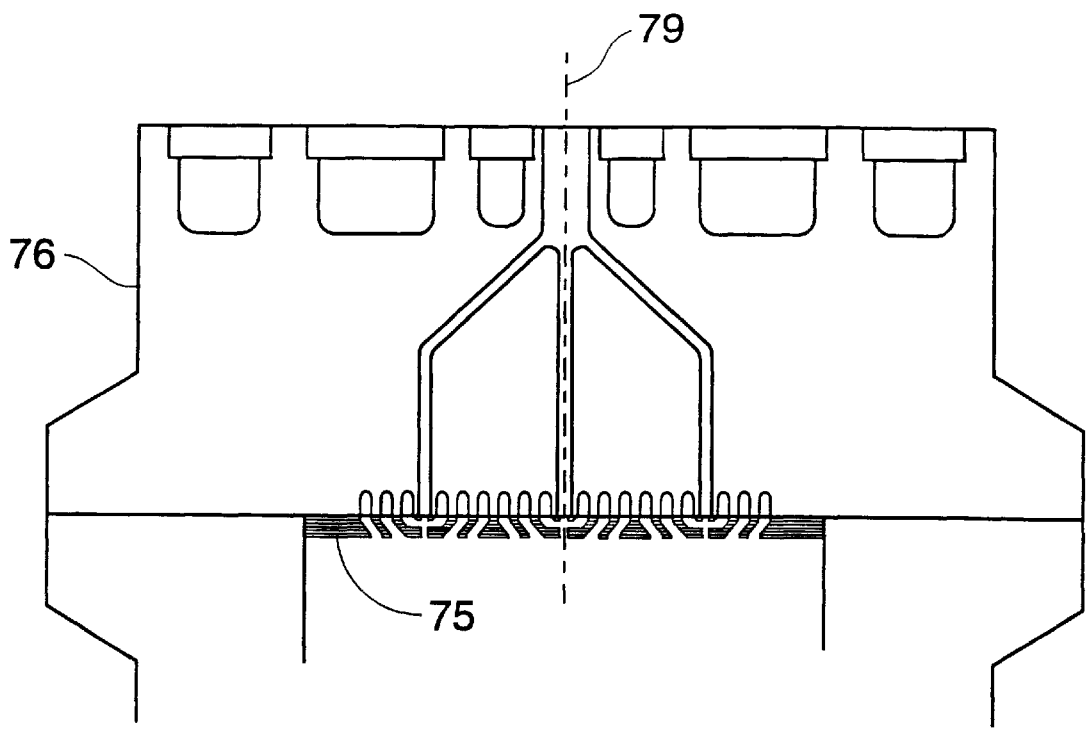
FIG. 4a is a longitudinal cross section of a third example of an injector in accordance with the present invention.
Figure 4B:
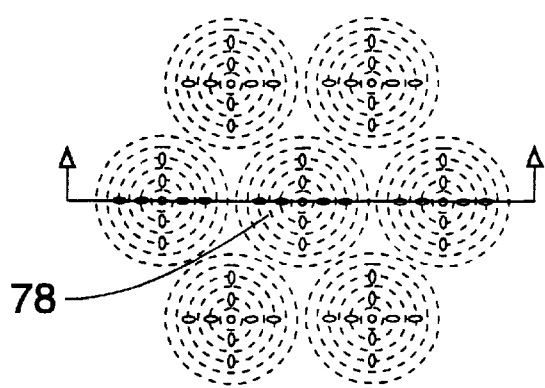
FIG. 4b is a plan view of the face of the injector of FIG. 4a exposed to the reaction zone of a tubular SCWO reactor.

One such injector is shown in FIGS. 4a and 4b. The exposed face 75 of the injector 76 contains seven port arrays 77, each one identical to the concentric circle arrangement shown in FIG. 3. In only one 78 of the arrays is the fuel port aligned with the centerline 79 of the injector and the tubular reactor. The other six arrays are equally spaced around the central array 78. An arrangement of this type with multiple fuel jets, each surrounded by jets of the remaining feed components, is particularly suitable for tubular reactors having an internal diameter of from about 6.0 inches (15.24 cm) to about 18.0 inches (45.72 cm). Single-array injectors of the types shown in FIGS. 1a, 1b, 2 and 3 are best suited to tubular reactors having an internal diameter of from about 1.0 inch (2.54 cm) to about 6.0 inch (15.24 cm).

Figure 5A:
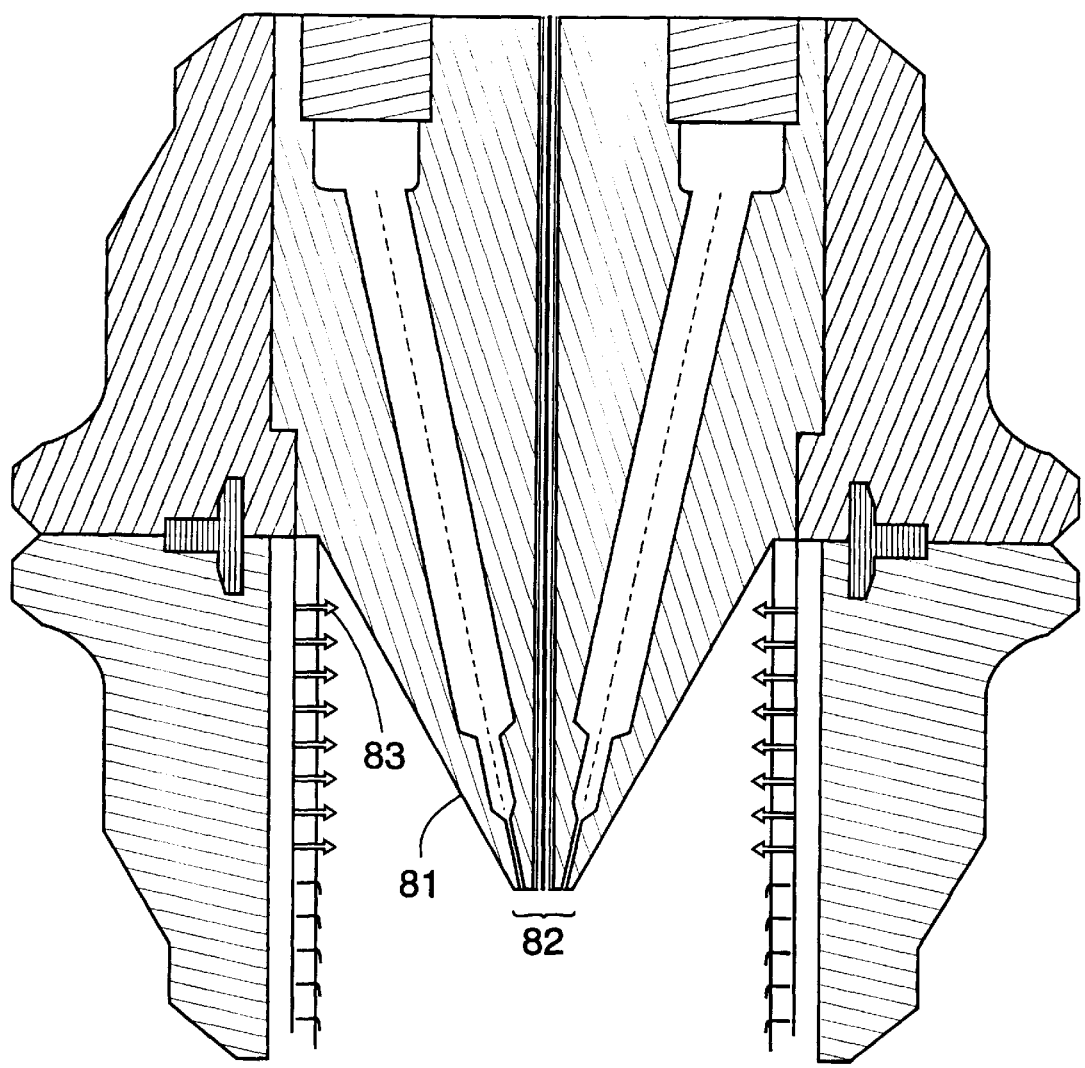
FIG. 5a is a longitudinal cross section of a fourth example of an injector in accordance with the present invention.
Figure 5B:
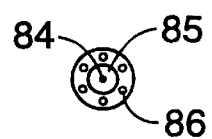
FIG. 5b is a plan view of the face of the injector of FIG. 5a extending furthest into the reaction zone.

A variation on the injector configuration appears in FIGS. 5a and 5b. In this injector, the injector face 81 is conical in shape and thrust forward into the reaction space, placing the injection ports 82 inside an already flowing stream, and markedly reducing the risks and occurrences of recirculation in the reaction zone. Water fed through the side walls of the reactor for temperature control as in the preceding drawings, but higher water flows are fed through wall ports 83 located upstream of the injection ports 82. As described in U.S. Pat. No. 5,387,398 referenced above, the flow rates and temperatures of water fed through these wall ports is varied along the length of the tubular reactor in accordance with the functions served by the incoming water. At the upstream end, the incoming water can be hot enough to serve as a means of preheating the reaction environment and thereby lessening the heating burden on the incoming fuel stream.

As shown in FIG. 5b, this injector contains a central fuel jet 84 surrounded by an annular oxidant stream 85, and does not contain a series of hot water jets adjacent to the fuel jet to bring the fuel to combustion temperature. Heating of the fuel is instead achieved by preheating of the fuel prior to its entering the injector, or by the upstream water jets 83 positioned along the reactor wall. The water material is fed through six jets 86 surrounding the annular oxidant stream 85.

Figure 6A:
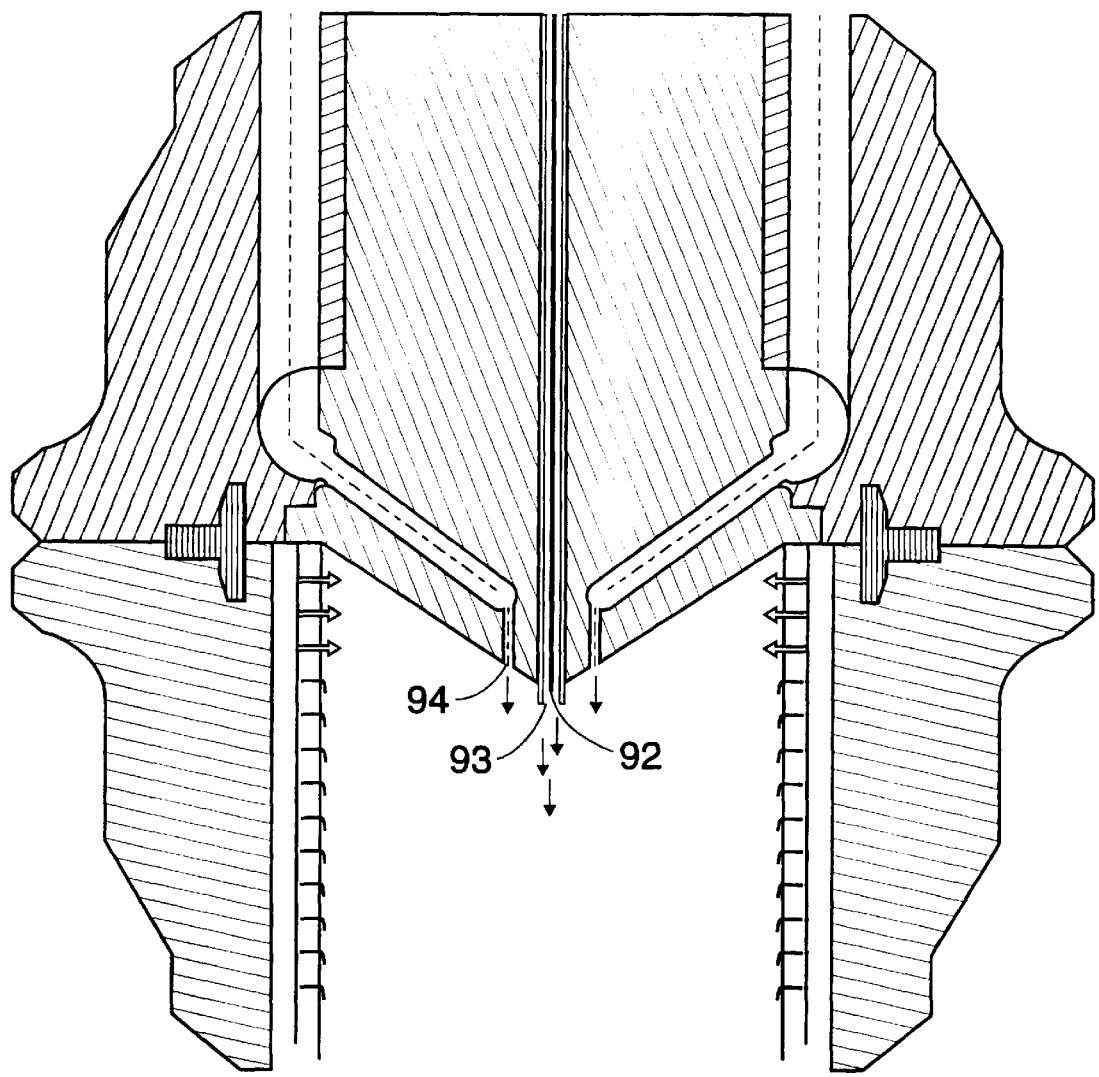
FIG. 6a is a longitudinal cross section of a fifth example of an injector in accordance with the present invention.
Figure 6B:
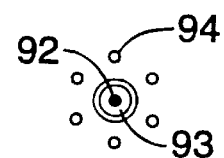
FIG. 6b is a diagram showing the arrangement of ports of the injector of FIG. 6aprojected onto a plane.

A further variation is shown in FIGS. 6a and 6b, where the injector face 91 is conical in shape as in FIG. 6a, again placing the injection ports in an already moving stream of hot water. The number, shape and arrangement of the injection ports is similar to those of FIGS. 5a and 5b, with a central fuel port 92, an annular oxidant port 93 surrounding the fuel port, and several waste material ports 94 arranged in a circular array concentric with the fuel port and oxidant port. Here, however, the fuel port 92 is recessed relative to the opening of the annular oxygen port 93, and all jets are directed parallel to the centerline of the tubular reactor.

Figure 7A:
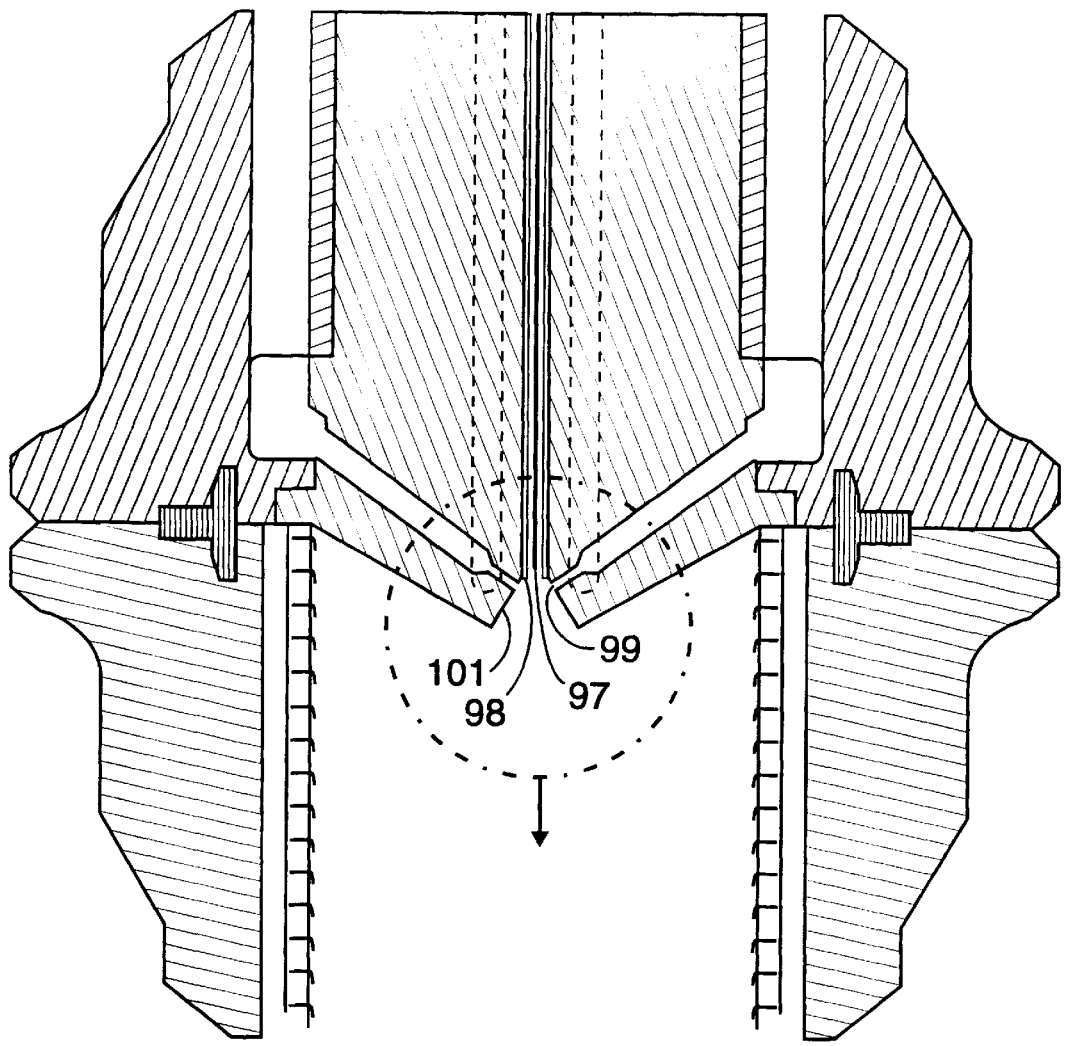
FIG. 7a is a longitudinal cross section of a sixth example of an injector in accordance with the present invention.
Figure 7B:
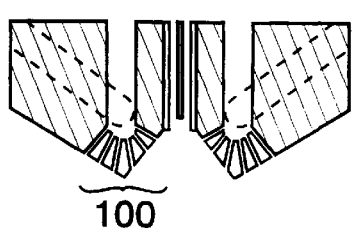
Figure 7C:
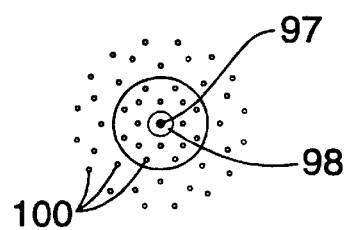
FIG. 7c is a diagram showing the arrangement of ports of the injector of FIG. 7aprojected onto a plane.

The injector shown in FIGS. 7a, 7b and 7c differs from that of FIGS. 5a, 5b, 6a and 6b by both the fuel port 97 and the annular oxidant port 98 being recessed relative to both the waste material ports 99 and the coolant water ports 100. The coolant water ports 100 in this design form a spray in diverging directions, thereby specifically providing protection of the surface of the injector from solids deposition and corrosion. The face surface 101 immediately surrounding the injection ports for the fuel, oxidant and waste material 97, 98, 99 is shaped as an inverted cone. This helps avoid recirculation and promotes a smooth flow in conformance with the shape of the ignition flame.

Figure 8:
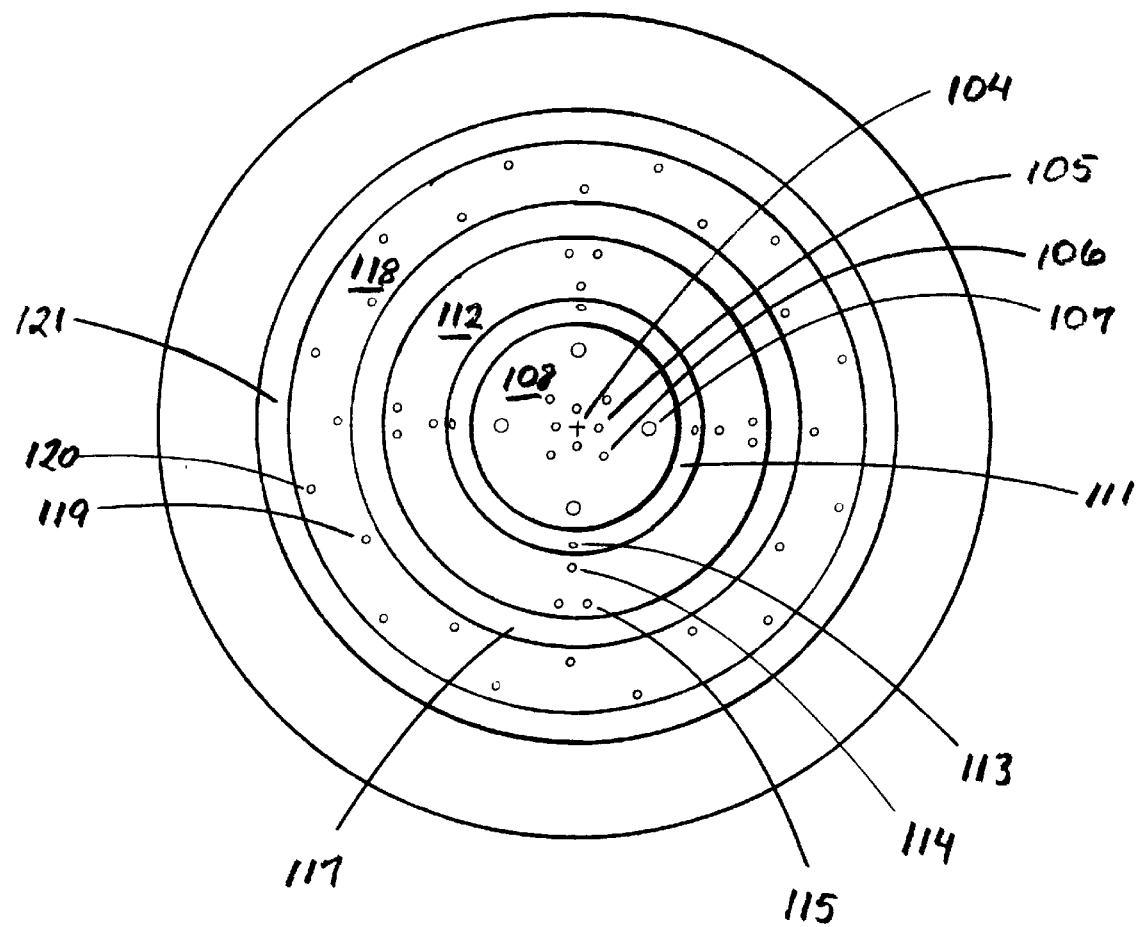
FIG. 8 is a fourth example of an injector in accordance with the present invention, showing a plan view of the arrangement of ports.

A still further variation is shown in FIGS. 8 and 9, in which the incoming streams are arranged to impinge upon each other in a multitude of combinations to enhance mixing. Like the configurations shown in the preceding figures, the various fuel ports are arranged in circular arrays around the centerline 104 of the injector face. Closest to the centerline are four equally spaced fuel ports 105. The internal passages leading to these ports are oriented to cause the emerging streams to diverge and flow outward, away from the centerline 104. Surrounding the array of fuel ports 105 are two circular arrays of ports 106, 107, four ports in each array, each of which supplies hot water. All twelve ports 105, 106, 107 are on a recessed planar surface 108 at the center of the injector face.

The eight hot water ports 106, 107 each direct hot water inward toward the centerline 104. The inner four hot water ports 106 are positioned at angles intermediate to the angular positions of the fuel ports 105, with the result that the hot water streams from these ports flow between the fuel streams from the fuel ports 105, avoiding impingement of the fuel and hot water where these streams cross. The hot water streams themselves converge at a four-stream convergence point 109, located on the centerline 104. The outer four hot water ports 107, by contrast, are radially aligned with the fuel ports 105 and thereby impinge upon the fuel streams at two-stream convergence points 110. There are four such two-stream convergence points, and these points are not on the centerline. In a presently preferred construction incorporating this design, the fuel ports 105 direct the fuel outward at an angle of 30° relative to the centerline 104, while the inner hot water ports 106 direct hot water inward at the same angle, and the outer hot water ports 107 direct hot water inward at an angle of 10°. The distances from the ports to the centerline are selected such that the locations of the impinging streams (both four-stream convergence 109 and two-stream convergence 110) are all the same distance from the recessed surface of the injector face (i.e., in a common plane parallel to the recessed surface 108).

A sloping conical wall 111 surrounding the central recessed surface 108 leads to a raised ring 112. An internal channel feeds oxidant to eight ports arranged in two concentric circles of four ports each—an inner circle 113 positioned on the sloping wall 111 and an outer circle 114 on the raised ring. All eight ports are radially aligned with the fuel ports 105. The ports of the inner circle 113 direct their streams inward toward the centerline 104, where they converge and impinge upon the spray created by the impinging fuel and hot water streams. The ports of the outer circle 114 direct their streams parallel to the centerline. On the planar surface of the raised ring 112 are eight ports 115 for the introduction of the waste material sought to be oxidized. These ports form a single circle concentric with the centerline 104, but are grouped into pairs along the circle. The ports are engineered to direct the two waste streams of each pair both toward each other (transverse to the radial direction of the injector) and toward the center. Each pair thus impinges first on itself and then on the oxidant stream formed by the outer oxidant ports 114.

A second sloping conical wall 117, sloping in the direction opposite to that of the first 111, leads to a recessed ring or circular trough 118 in the injector face, along the periphery of the recessed ring. The planar surface of this recessed ring (i.e., the bottom of the trough) contains two circular arrays 119, 120 of twelve ports each, for introduction of cooling water. The ports of the inner circular array 119 are angled inward toward the centerline 104 of the injector to strike the inner sloping wall 117 of the recessed ring, while the ports of the outer circular array 120 are angled outward, away from the centerline, to strike the outer sloping wall 121 of the recess. With this arrangement, all surfaces are flushed and washed continuously to prevent salt deposition and corrosion.

The injectors of this invention can accommodate a variety of materials for SCWO, including different fuels, oxidants and waste materials. Examples of fuels are methane, methanol, ethanol, propanol and isopropanol. Examples of oxidants are air, oxygen, ozone and hydrogen peroxide. Isopropanol and oxygen are a preferred combination. Possible waste materials have been discussed above.

The diameters of the ports may vary and are not critical to the invention. Typical diameters will generally range from about 0.008 inch (0.203 mm) to about 0.0125 inch (3,175 mm), and preferably from about 0.020 inch (0.508 mm) to about 0.080 inch (2.032 mm). As indicated by the drawings, when the fuel does not require heating by hot water either inside the reaction space in the tubular reactor or immediately prior to its emergence from the injector, the oxidant can either have an annular flow configuration surrounding the fuel jet, or be supplied as a series of jets arranged to surround the fuel jet, preferably in a circular array. When the oxidant is supplied as an annular flow stream, the diameter of the annular port will generally be from about 0.008 inch (0.203 mm) to about 0.030 inch (0.762 mm). When hot water jets are supplied to heat the fuel to ignition temperature, the oxidant will most conveniently be in the form of jets encircling the circle of hot water jets. The number of ports in each circular array can vary, but will generally range from 3 to 24, preferably from 6 to 12. For ports located a further distance from the fuel port, the number will often increase. Also, while the jet arrays are preferably circular for each series of jets of any one type of fluid, the jets for cooling water where cooling water is supplied in this manner can form an array consisting of two or more circles or other patterned arrays extending over broad surface areas. When the ports are series of individual ports arranged in circular arrays around the fuel port, the waste material ports will preferably form a circle having a diameter of from about 0.2 cm to about 2.0 cm, and most preferably from about 0.2 cm to about 1.0 cm. Likewise, the oxidant ports will preferably form a circle having a diameter of from about 0.1 cm to about 1.5 cm, and most preferably from about 0.1 cm to about 0.7 cm.

The injector is preferably constructed of a metallic material that is resistant to corrosion, such as Inconel-625 or steel. The injector face may be laminated with platinum. Methods for preheating the incoming streams, which include the fuel, the hot water, the oxidant, the waste material, or any combination of these, will be readily apparent to those skilled in the art of supercritical water oxidation, since the same techniques used in prior art SCWO reactors may be used here as well.

The foregoing is offered primarily for purposes of illustration. It will be readily apparent to those skilled in the art that the number, type and arrangement of the ports, the dimensions, both absolute and relative, of the ports and ducts and the directions of flow, as well as the materials, operating conditions and other parameters of the device described in this specification can be further modified or substituted in various ways without departing from the spirit and scope of the invention.

We claim:

1. An injector for a supercritical water oxidation reactor or fluid oxidizable matter, said injector comprising:
    a fuel port and a supply of fuel thereto;
    means for heating fuel emerging from said fuel port to a temperature of at least about 375° C.;
    a plurality of oxidizable matter ports arranged in an array surrounding said fuel port, and a supply of fluid oxidizable matter to each of said oxidizable matter ports; and
    means for supplying oxidant between said fuel port and said array of oxidizable matter ports.

2. An injector in accordance with claim 1 in which said means for heating fuel is comprised of a plurality of hot water ports surrounding said fuel port and between said fuel port and said means for supplying oxidant.

3. An injector in accordance with claim 1 further comprising a plurality of coolant water ports surrounding said fuel port, said oxidizable matter ports and said means for supplying oxidant.

4. An injector in accordance with claim 1 in which said array of oxidizable matter ports is defined as a first array, and said means for supplying oxidant is comprised of a plurality of oxidant ports arranged in a second array between said fuel port and said first array.

5. An injector in accordance with claim 4 in which said first and second arrays are substantially circular and concentric.

6. An injector in accordance with claim 4 in which said fuel port and said first and second arrays are concentric.

7. An injector in accordance with claim 4 in which said fuel port is shaped to direct said fuel in a direction defined as an axis, and said oxidant ports are shaped to direct said oxidant in directions parallel to said axis.

8. An injector in accordance with claim 7 in which said oxidizable matter ports are shaped to direct said oxidant in directions parallel to said axis.

9. An injector in accordance with claim 7 in which said oxidizable matter ports are shaped to direct said oxidizable matter in directions intersecting said axis.

10. An injector in accordance with claim 4 in which said fuel port is shaped to direct said fuel in a direction defined as an axis, and said oxidant ports and said oxidizable matter ports are shaped to direct said oxidant and said oxidizable matter in directions intersecting said axis.

11. An injector in accordance with claim 4 in which said fuel port comprises a plurality of fuel ports arranged in a third array, and said first and second arrays surround said third array.

12. An injector in accordance with claim 11 in which said first, second and third arrays are substantially circular and concentric, thereby defining a common center, and said injector has an axis intersecting said common center.

13. An injector in accordance with claim 12 in which said oxidant ports are shaped to direct said oxidant in directions parallel to said axis.

14. An injector in accordance with claim 12 in which said means for heating fuel is comprised of a plurality of hot water ports arranged in a fourth array surrounding said third array.

15. An injector in accordance with claim 14 in which said fuel ports are shaped to direct said fuel in directions diverging from said axis.

16. An injector in accordance with claim 14 in which said fuel ports are shaped to direct said fuel indirections diverging from said axis, and said hot water ports are shaped to direct said hot water in direction converging toward said axis.

17. An injector in accordance with claim 14 further comprising a plurality of coolant water ports arranged in an array surrounding said first, second third and fourth arrays.

18. An injector in accordance with claim 4 in which said first array is substantially circular and has a diameter of from about 0.2 cm to about 2.0 cm, and said second array is substantially circular and has a diameter of from about 0.1 cm to about 1.5 cm.

19. An injector in accordance with claim 4 in which said first array is substantially circular and has a diameter of from about 0.2 cm to about 1.0 cm, and said second array is substantially circular and has a diameter of from about 0.1 cm to about 0.7 cm.

* * * * *